(12) United States Patent
Hou

(10) Patent No.: US 7,822,427 B1
(45) Date of Patent: Oct. 26, 2010

(54) METHOD AND SYSTEM FOR USING A WIRELESS SIGNAL RECEIVED VIA A REPEATER FOR LOCATION DETERMINATION

(75) Inventor: Jiongkuan Hou, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 646 days.

(21) Appl. No.: 11/544,682

(22) Filed: Oct. 6, 2006

(51) Int. Cl.
*H04W 24/00* (2009.01)
(52) U.S. Cl. .................. 455/456.2; 370/274; 370/315
(58) Field of Classification Search ............. 455/456.1, 455/456.2, 13.1, 561
See application file for complete search history.

(56) References Cited

U.S. PATENT DOCUMENTS

| | | | |
|---|---|---|---|
| 6,236,365 | B1 | 5/2001 | LeBlanc et al. |
| 6,952,181 | B2 | 10/2005 | Karr et al. |
| 7,082,155 | B1 * | 7/2006 | Ogami .................... 375/147 |
| 2001/0053180 | A1 * | 12/2001 | Asia et al. ................ 375/222 |
| 2003/0222819 | A1 | 12/2003 | Karr et al. |
| 2004/0137912 | A1 | 7/2004 | Lin |
| 2004/0219930 | A1 * | 11/2004 | Lin ........................ 455/456.1 |
| 2005/0020309 | A1 * | 1/2005 | Moeglein et al. ......... 455/456.1 |
| 2005/0054312 | A1 | 3/2005 | Spirito et al. |
| 2006/0025158 | A1 | 2/2006 | Leblanc et al. |
| 2008/0248744 | A1 * | 10/2008 | Beck et al. .................... 455/7 |

OTHER PUBLICATIONS

Theodore S. Rappaport, "Wireless Communications Principles and Practice", Prentice Hall PTR, 2002, pp. 145-157.

* cited by examiner

*Primary Examiner*—Lester Kincaid
*Assistant Examiner*—Marcos Batista

(57) ABSTRACT

A base station almanac (BSA) includes entries for a plurality of repeaters. An entry for a repeater includes location-determination parameters associated with that repeater, such as (i) a repeater forward link calibration (FLC) value that correct for transmission delay associated with the repeater and (ii) a center point of the repeater's coverage area. A measured power level and a measured phase of a wireless signal transmitted by a base transceiver station (BTS) and received by the mobile station are obtained. An expected received power level is calculated based on the measured phase and the transmit power level of the BTS. If the measured power level exceeds the expected received power level by at least a predetermined amount, then it is determined that the mobile station received the wireless signal via a repeater and one or more location-determination parameters associated with the repeater are used to determine the mobile station's location.

15 Claims, 9 Drawing Sheets

METHOD AND SYSTEM FOR USING A WIRELESS SIGNAL RECEIVED VIA A REPEATER FOR LOCATION DETERMINATION

BACKGROUND

1. Field of the Invention

The present invention relates to determining the locations of mobile stations, more particularly, to a method and system for enabling a wireless signal that a mobile station receives via a repeater to be used for location determination.

2. Description of Related Art

The Global Positioning System (GPS) is often used to determine the locations of mobile stations, for example, to provide location-based services. Such location-based services include services, such as roadside assistance, direction assistance, vehicle tracking, weather forecasts, etc., that make use of the locations of mobile stations. Although GPS-based positioning methods are often the most accurate type of positioning method, a mobile station may not always be able to receive good signals from a sufficient number of GPS satellites. This can occur, for example, because of poor weather conditions or because the mobile station is in an urban or indoor environment.

Because of the limitations of GPS-based positioning methods, terrestrial positioning methods have also been developed. In terrestrial positioning, signals from one or more terrestrial locations, such as signals transmitted by base transceiver stations (BTSs) in wireless telecommunications networks, are used to determine the location of a mobile station. Such terrestrial positioning methods include advanced forward link trilateration (AFLT) methods, hybrid methods, and cell ID methods.

In a typical AFLT method, a mobile station measures the phases of pilot signals transmitted from four BTSs. In CDMA networks, each pilot signal is synchronized to a standard time, such as a GPS time (although each BTS may be associated with a particular time offset). As a result, the phase of a pilot signal from a BTS that is measured by a mobile station represents the transmission delay of the pilot signal, which, in turn, can be used to calculate the distance between the mobile station and the BTS. In this way, the distances between the mobile station and the four BTSs may be calculated. These four distance measurements can then be used to calculate the mobile station's location and time offset, provided the locations of the BTSs and their respective time offsets are known.

A mobile station's location may also be calculated using a hybrid method. In a hybrid method, measurements of one or more terrestrial signals are combined with measurements of signals from one or more GPS satellites to determine a mobile station's location. For example, one, two, or three of the distance measurements that would be used for AFLT may be replaced by measurements of signals from GPS satellites.

Cell ID methods are typically simpler but less accurate than AFLT and hybrid methods. The wireless coverage area (e.g., the cell or sector) currently serving the mobile station is identified, and the mobile station's location is taken to be the center point of the wireless coverage area. An uncertainty in the mobile station's location may also be provided. The uncertainty may roughly correspond to the radius of the wireless coverage area.

To support AFLT, hybrid, and cell ID methods, CDMA networks often store parameters used for location determination in a base station almanac (BSA). These location-determination parameters may include: (i) the locations (e.g., latitude and longitude coordinates) of the BTSs; (ii) forward link calibration (FLC) values that may be used to correct for the time offsets of the BTSs; (iii) and cell/sector center points and uncertainties. During a location determination session, a network element such as a location engine may calculate the mobile station's location based on signal measurements reported by the mobile station (e.g., phase measurements of pilot signals from one or more BTSs) and the location-determination parameters stored in the BSA.

However, repeaters are increasingly being used in wireless telecommunication network to expand wireless coverage. For example, repeaters are often used to fill coverage "holes" in areas such as office buildings, highways, and tunnels. On the downlink, a repeater typically receives signals from a donor BTS (either wirelessly or via a cable), amplifies the signals, and repeats the signals into a repeater coverage area. On the uplink, a repeater typically receives wireless signals from mobile stations operating in the repeater coverage area, amplifies the signals, and forwards the signals to the donor BTS. A repeater typically amplifies the uplink and downlink signals without changing the content of the signals.

Although repeaters are often effective at improving wireless coverage, repeaters can cause difficulties for terrestrial positioning methods. As noted above, AFLT and hybrid methods calculate distances based on the transmission delays (measured as phases) of wireless signals transmitted by one or more BTS. However, repeaters impose additional transmission delays on the signals that they repeat. As a result, when a mobile station receives a wireless signals via a repeater, the distance to the BTS that is calculated from the signal's transmission delay may not be accurate, even when corrected by the BTSs FLC value.

Cell ID methods can also be affected by repeaters. Because a repeater is typically used to expand wireless coverage beyond what the donor BTS provides directly, the donor BTS's cell/sector center point may not be a useful estimate of the location of a mobile station that is being served by the repeater.

Current approaches for addressing location-determination problems caused by repeaters have significant disadvantages. In an approach that has been used for AFLT and hybrid methods, the BSA flags each BTS that has a repeater. Signals from the flagged BTSs are then excluded from AFLT and hybrid location determinations. However, if one or more of the wireless signals received by a mobile station for location determination is excluded as being from a flagged BTS, then the number of available wireless signals may be insufficient to obtain a valid AFLT or hybrid location fix. The less-accurate cell ID method might then be used as a fall-back.

In an approach that has been used for cell ID methods, the total coverage area provided by the donor BTS and the repeater is used to calculate the cell/sector center point. However, increasing the size of the coverage area used for the calculation will also increase the uncertainty that is associated with using the center point as the mobile station's location.

Accordingly, there is a need to provide ways of using wireless signals that are received via repeaters for location determination.

SUMMARY

In a first principal aspect, an exemplary embodiment of the present invention provides a method for mobile station location determination. In accordance with the method, a measured power level and a measured phase of a wireless signal received by a mobile station are obtained. It is determined from the measured power level and the measured phase that the mobile station received the wireless signal via a repeater. At least one location-determination parameter associated with the repeater is obtained. A location of the mobile station is determined using the at least one location-determination parameter.

In a second principal aspect, an exemplary embodiment of the present invention provides a system for mobile station location determination. The system comprises data storage storing location-determination information and a location engine for determining locations of mobile stations using the location-determination information. The location-determination information includes location-determination parameters for a plurality of repeaters.

In a third principal aspect, an exemplary embodiment of the present invention provides a method for calibrating a repeater. In accordance with the method, a wireless signal transmitted from a base transceiver station (BTS) and received at a measurement point via a repeater is measured to obtain a signal measurement. The signal measurement is used to calculate a first estimate of a distance between the measurement point and the BTS. A second estimate of the distance between the measurement point and the BTS is also obtained, wherein the second estimate is more accurate than the first estimate. A calibration value that corrects for a difference between the first and second estimates is calculated.

DETAILED DESCRIPTION OF EXEMPLARY EMBODIMENTS

1. Overview

Figure 1:
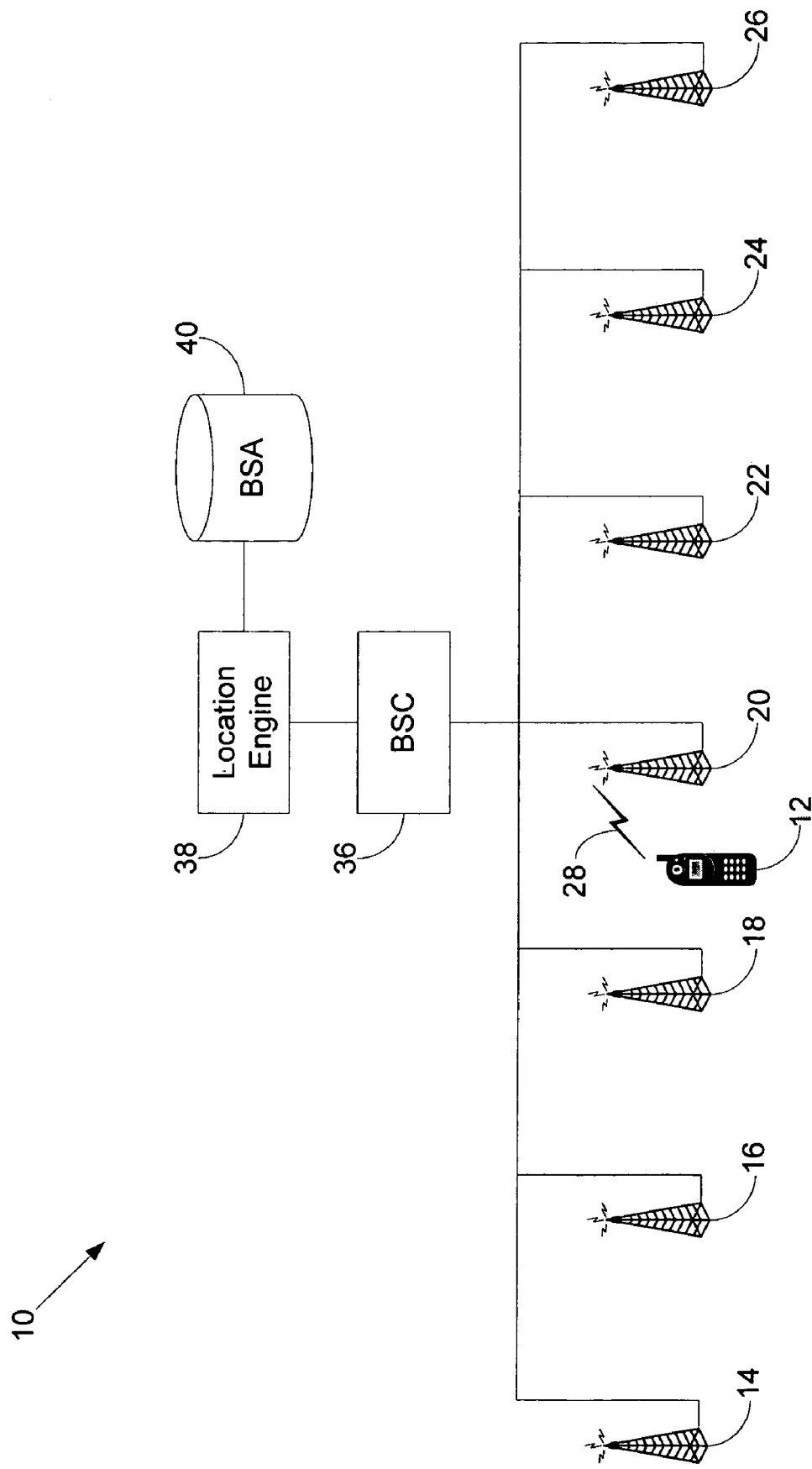
FIG. 1 is a simplified block diagram of a wireless telecommunications network, in accordance with an exemplary embodiment.

The present invention, in its exemplary embodiments, is directed to reducing location determination inaccuracies caused by repeaters, by using one or more repeater-specific location-determination parameters when it is determined that a mobile station is receiving a wireless signal via a repeater. The location-determination parameters associated with a repeater may be stored, e.g., in a base station almanac (BSA), in an entry for that repeater. The location-determination parameters for a repeater may include (i) a repeater forward link calibration (FLC) value that corrects for transmission delay associated with the repeater (the repeater FLC value may also correct for the time offset of the repeater's donor BTS) and (ii) a center point of the repeater's coverage area. A repeater entry may also include other information.

One or more repeater-specific location-determination parameters may be used to determine the location of a mobile station when it is determined that the mobile station is receiving a wireless signal via a repeater. To make this determination, the mobile station may measure the power level and phase of a wireless signal (e.g., a pilot signal) from a particular BTS to obtain a measured power level and a measured phase. An expected received power level is calculated based on the measured phase and the transmit power level of the BTS. If the measured power level exceeds the expected received power by at least a predetermined amount, then it may be determined that the mobile station received the wireless signal via a repeater. In that case, one or more location-determination parameters associated with the repeater may be used to determine the mobile station's location, depending on the location determination method. For example, in advanced forward link trilateration (AFLT) or hybrid methods, the repeater's FLC value may be hybrid used to adjust the transmission delay calculated from the phase measurement, so as to correct for transmission delay caused by the repeater and to correct for the donor BTS's time offset. For a cell ID method, the location of the mobile station may be taken as the center point of the receiver's coverage area. This location may also be associated with an uncertainty value related to the size of the repeater's coverage area.

The location-determination parameters for a repeater may be determined by comparing location information obtained using AFLT, hybrid, or cell ID methods applied to a wireless signal received via the repeater with location information obtained using more accurate methods, e.g., using the Global Position System (GPS). For example, to develop an FLC value for a repeater, a mobile station located at a measurement point may measure a wireless signal from a particular BTS and received via the repeater, to obtain a signal measurement (e.g., a measurement of the phase of the pilot signal from the BTS). The signal measurement may then be used to calculate a first estimate of a distance between the measurement point and the BTS. While at the measurement point, the mobile station may also obtain a location fix using GPS. The GPS location fix may be used to calculate a second, more accurate estimate of the distance between the measurement point and the BTS. A calibration value that corrects for the difference between the first and second estimates may then be calculated. This procedure may be repeated a statistically significant number of times, e.g., using different mobile stations at different measurement points, to obtain a plurality of calibration values. The calibration values may be averaged, and the average value may be stored in the BSA as the FLC value for the repeater.

The center point of the repeater's coverage area may also be determined using GPS. For example, when a GPS location fix is obtained for a mobile station in the repeater's coverage area, the location fix may be archived for the repeater. Over time, the number of archived GPS location fixes for the repeater may reach a statistically significant level. The center point of the repeater's coverage area may then be taken as the average of the latitude and longitude values from the archived GPS location fixes. An uncertainty value may also be calculated from the archived GPS location fixes.

In this way, location-determination parameters may be developed for each repeater and stored in the BSA. Then, when a mobile station receives a wireless signal via a repeater, the location-determination parameters for the repeater may be retrieved from the BSA and used to determine the location of the mobile station.

2. Exemplary Network Architecture

FIG. 1 is a block diagram illustrating an exemplary wireless telecommunications network 10 that provides wireless service to mobile stations, such as mobile station 12. Wireless telecommunications network 10 includes a plurality of base transceiver stations (BTSs), exemplified in FIG. 1 by BTSs 14, 16, 18, 20, 22, 24, and 26. Although network 10 is shown in FIG. 1 with seven BTSs, it is to be understood that network 10 could include a greater or fewer number.

Each BTS includes at least one antenna to provide wireless coverage in an area such as a cell or sector, within which the BTS may wirelessly communicate with one or more mobile stations. Such wireless communication may involve the mobile station transmitting or receiving voice, data, or other media via an air interface. For example, mobile station 12 may be operating in a wireless coverage area provided by BTS 20 and may communicate with BTS 20 via an air interface 28. In an exemplary embodiment, the air interface communications in network 10 occur in a code division multiple access (CDMA) format. However, other air interface formats could also be used.

In addition to receiving voice, data, or other media, mobile station 12 may receive wireless signals from one or more BTSs for other purposes. In particular, mobile station 12 may receive pilot signals from one or more of BTSs 14-26 for location determination purposes, e.g., using AFLT or hybrid methods. Mobile station 12 may receive such pilot signals either directly or via repeaters.

Figure 2:
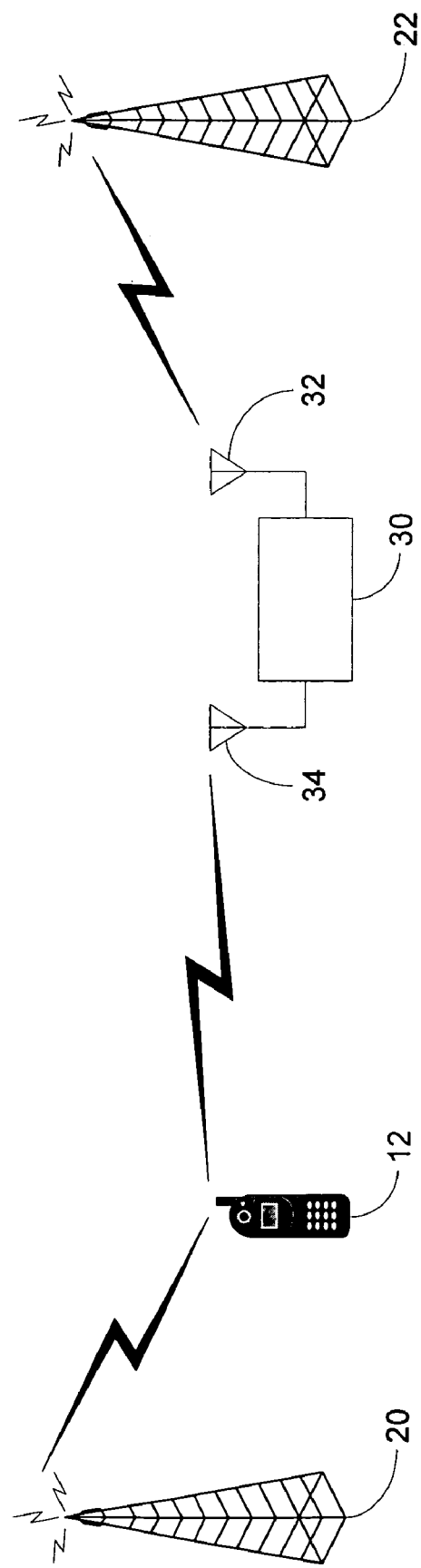
FIG. 2 is a diagram illustrating a mobile station receiving one wireless signal directly from a BTS and receiving another wireless signal via a repeater, in accordance with an exemplary embodiment.

For example, as illustrated in FIG. 2, mobile station 12 may be operating in a wireless coverage provided by BTS 20 such that mobile station 12 communicates with BTS 20 directly. However, mobile station 12 may also be able to receive a pilot signal from BTS 22 via a repeater 30. Repeater 30 may include a donor antenna 32 for wireless communication with a donor BTS, i.e., BTS 22, and a service antenna 34 for wireless communication with mobile stations, such as mobile station 12. More particularly, repeater 30 receives downlink signals from donor BTS 22 through donor antenna 32, amplifies the downlink signals, and transmits the amplified downlink signals through service antenna 34. Repeater 30 may also receive uplink signals through service antenna 34, amplify the uplink signals, and transmit the amplified uplink signals through donor antenna 32 for receipt by donor BTS 22.

In the example described above, mobile station 12 is being served by BTS 20 directly and is also able to receive pilot signals from BTS 22 via repeater 30. However, in a different location, mobile station 12 might be served by BTS 22 via repeater 30 (i.e., when mobile station 12 is within the coverage area of repeater 30). At that location, mobile station 12 might also be able to receive pilot-signals from other BTSs, such as BTS 20, for location determination purposes. In still other locations, mobile station 12 might be served by BTS 22 directly rather than via repeater 30.

With reference to FIG. 1, BTSs 14-26 may be controlled by one or more base station controllers, such as base station controller (BSC) 36. BSC 36 may, in turn, communicate with other network elements, such as a mobile switching center (MSC) and/or packet data serving node (PDSN) to support the exchange of voice, data, or other media with mobile stations, such as mobile station 12. BSC 36 may also communicate with a location engine 38, in order to support location determinations of mobile stations, such as mobile station 12. Location engine 38 may perform calculations to determine the locations of mobile stations, for example, based on signal measurements provided by the mobile stations and location-determination information stored in network 10.

In an exemplary embodiment, network 10 stores location-determination information in the form of a base station almanac (BSA). The BSA may be stored in a BSA database 40 that is accessible by location engine 38. The BSA may include BTS entries for BTSs such as BTSs 14-26 and repeater entries for repeaters such as repeater 30. A BTS entry may identify a location of the BTS, e.g., in terms of latitude and longitude coordinates. A BTS entry may also other information that may be used in AFLT, hybrid, or cell ID location-determination methods. To support AFLT and hybrid methods, a BTS entry may include an FLC value that corrects for a time offset associated with the BTS. To support cell ID methods, a BTS entry may include a center point (e.g., in terms of latitude and longitude coordinates) of the BTS's wireless coverage area and an uncertainty value that accounts for the size of the coverage area. A BTS entry may also include information that can be used to determine whether a signal from that BTS is received via a repeater. For example, a BTS entry may include a flag that indicates whether a repeater is associated with the BTS. When a BTS is flagged as having a repeater, the BTS entry may also specify the transmit power lever of the BTS's pilot signal, in order to support path loss calculations described in more detail below.

The repeater entries in the BSA may include information that may be used in AFLT, hybrid, or cell ID location-determination methods when wireless signals are received via the listed repeaters. More particularly, a repeater entry may identify a particular repeater, for example, by identifying the repeater's donor BTS. The donor BTS may be identified in terms of system ID (SID), network ID (NID), and base station ID. A repeater entry may also specify the type of repeater, for example, whether the repeater communicates with the donor BTS over the air or via a fiber-feed. Moreover, a repeater entry may information that may be used in AFLT, hybrid, or cell ID location-determination methods. To support AFLT and hybrid methods, a repeater entry may include a repeater FLC value that corrects for a transmission delay associated with the repeater. The repeater FLC value may also correct for the time offset of the repeater's donor BTS. To support cell ID methods, a repeater entry may include a center point (e.g., in terms of latitude and longitude coordinates) of the repeater's coverage area and an uncertainty value that accounts for the size of the repeater's coverage area.

Figure 3:
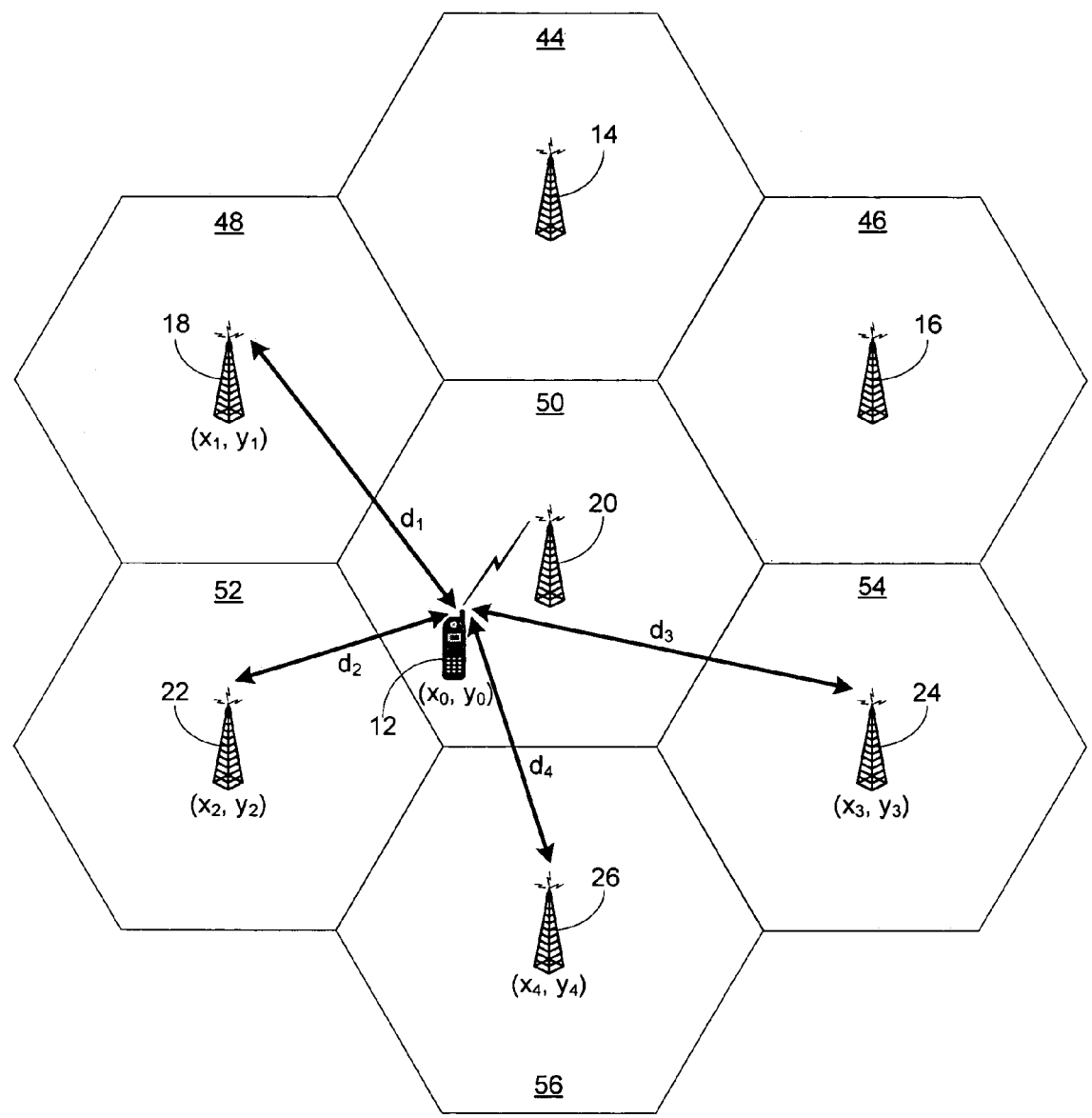
FIG. 3 is a diagram illustrating an arrangement of wireless coverage areas for the wireless telecommunications network shown in FIG. 1, in accordance with an exemplary embodiment.

FIG. 3 illustrates an exemplary arrangement of BTSs 14-26. In FIG. 3, BTSs 14-26 provide wireless coverage in areas that are conceptualized as hexagonal cells 44-56, respectively. It should be understood that the hexagonal shape of the cells shown in FIG. 3 is intended to represent only the relative locations of the cells. The actual shape of each cell may vary depending on such factors as the locations of the BTS antennas, transmission power levels, the terrain, and the locations of buildings or other obstructions. As shown in FIG. 3, mobile station 12 is operating in cell 50 and, thus, is being served by BTS 20. As indicated by the lines drawn as $d_1$, $d_2$, $d_3$, and $d_4$, mobile station 12 may also be able to measure wireless signals transmitted from BTSs located in one or more neighboring cells, e.g., from BTSs 18, 22, 24, and 26. Measurements of the phases of these wireless signals may be used to determine a location of mobile station, using AFLT or hybrid methods. However, if these location determination methods fail, a cell ID method may be used to determine the location of mobile station 12. In particular, the fact that mobile station 12 is being served by BTS 20 may be used to assign a coverage area center point as an estimate of the mobile station's location.

It is to be understood that mobile station 12 in FIG. 3 may receive wireless signals from one or more of BTSs 18-26 via a repeater. The presence of the repeater may be detected, e.g., by applying a power-delay relationship derived from a path loss model as described below, and the repeater may be accounted for in the location determination calculation by applying repeater-specific location-determination parameters. For example, if mobile station 12 receives a pilot signal of BTS 22 via a repeater, then the repeater's FLC value may be used to adjust the mobile station's phase measurement of the pilot signal in an AFLT or hybrid method. If a cell ID method is used, and mobile station 12 is being served by BTS 20 via a repeater, then the center point of the repeater's coverage area, rather than the center point of the BTS's coverage area, may be taken as the mobile station's location.

3. Exemplary Repeater Detection Method

A repeater typically functions at the physical layer only, amplifying wireless signals without changing the content of the signals. However, the fact that a repeater amplifies signals and also introduces additional delay means that the presence of repeater may be detected by comparing an expected received power level with the actual, measured received power level.

As a wireless signal propagates away from an antenna, the strength of the wireless signal attenuates with distance. Various path loss models have been developed to describe the attenuation of wireless signals as a function of distance. Examples of such path loss models include the Okumura model and the PCS extension of the Hata model. Such path loss models generally have the following format:

$$P_T - P_R = L = \alpha \log d + \beta \quad (1)$$

In equation (1), $P_T$ is the transmitted power level (in dB), $P_R$ is the received power level (in dB), L is the path loss (in dB), d is the distance between the BTS and the mobile station or other receiver, and $\alpha$ and $\beta$, are system-dependent parameters.

The $\alpha$ and $\beta$ parameters are dependent on factors such as frequency, environment, and the heights of the transmitting and receiving antennas. In an exemplary embodiment, the $\alpha$ and $\beta$ parameters are determined empirically, e.g., in accordance with the PCS extension of the Hata model. The $\alpha$ and $\beta$ parameters for a particular BTS may then be stored in the BTS's entry in the BSA. Alternatively, the location engine may use fixed values for $\alpha$ and $\beta$ rather than BTS-dependent values.

The distance, d, is related to the transmission delay, $\Delta t$, and the speed of light, c, through the following expression:

$$d = c\Delta t \quad (2)$$

The transmission delay, $\Delta t$, is calculated from the received phase of the pilot signal. Combining equations (1) and (2) yields the following relationship:

$$P_R = P_T - \alpha \log(c\Delta t) - \beta \quad (3)$$

Equation (3) can be used to predict an expected received power level, $P_R$, for a wireless signal from a BTS, given $P_T$, the transmit power level of the BTS's pilot signal, and $\Delta t$, the transmission delay calculated from the phase of the pilot signal measured at the receiver (e.g., measured by mobile station 12). However, if the wireless signal is received via a repeater, equation (3) will not hold.

Figure 4:
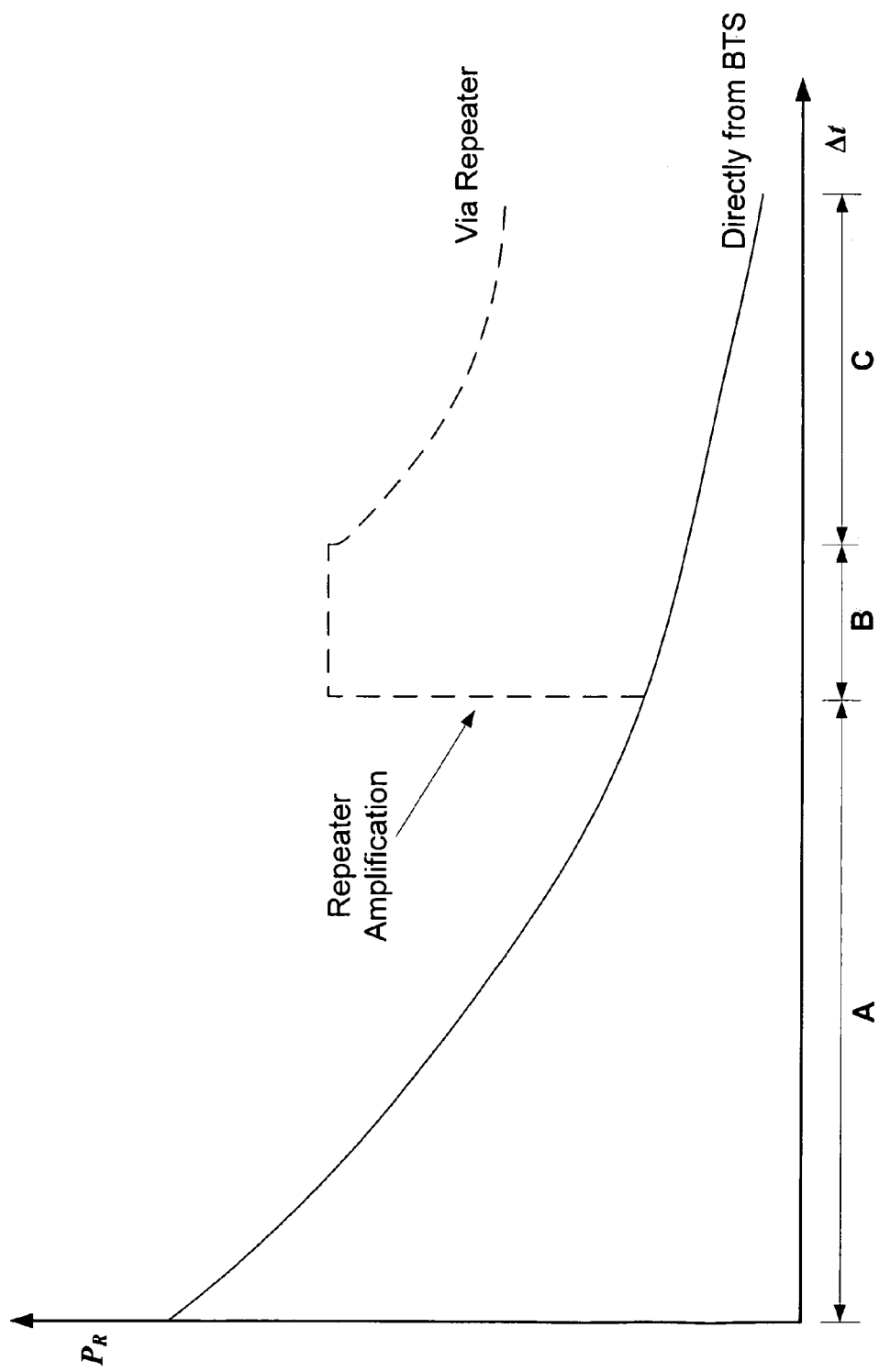
FIG. 4 is a plot of received power level versus transmission delay for a wireless signal received directly from a BTS and for a wireless signal received via a repeater, in accordance with an exemplary embodiment.

FIG. 4 illustrates the difference in power levels that would typically be observed when a wireless signal is received from a BTS directly and when the wireless signal is received via a repeater. In FIG. 4, the horizontal axis represents the transmission delay, $\Delta t$, of a wireless signal from a BTS, e.g., as reflected in the phase, and the vertical axis represents the received power level, $P_R$, of the wireless signal. The solid line shows a typical relationship between the received power level and the transmission delay when a wireless signal is received directly from a BTS. The dashed line shows a typical relationship between the received power level and the transmission delay when the same wireless signal is received via a repeater.

As a comparison between the dashed line (received via a repeater) and the solid (received from the BTS directly) clearly shows, the received power level of a wireless signal that has been received via a repeater will typically be significantly higher than the received power level of the wireless signal with the same transmission delay received directly from the BTS. For example, if a repeater is located 2000 meters away from its donor BTS, the power level of the pilot signal received via the repeater could be 108 dB higher than what would be expected from the pilot signal's transmission delay if equation (3) applied.

Two factors contribute to this difference. First, the repeater amplifies the signal that it receives from the donor BTS, typically by 70-100 dB. Second, the repeater imposes additional delay on the signal, e.g., due to the processing of the signal within the repeater. The different contributions to the transmission delay of a signal repeated by a repeater are represented in FIG. 4 as "A," "B," and "C." The "A" portion represents the propagation delay of the signal going from the donor BTS to the repeater. The "B" portion represents the delay within the repeater itself. The "C" portion represents the propagation delay going from the repeater to the receiver (e.g., mobile station 12). The "A" and "B" contributions may be corrected by the repeater's FLC value, as described in more detail below.

The substantial difference between the power level of a wireless signal received directly from the BTS as compared to the power level of the wireless signal with the same transmission delay when received via a repeater, allows a power-delay relationship to be used to detect repeaters. Equation (3), described above, is one example of a power-delay relationship that could be used. In particular, given $P_T$, the transmit power level of the BTS's pilot signal, and $\Delta t$, the transmission delay calculated from the phase of the pilot signal measured at the receiver (e.g., measured by mobile station 12), equation (3) can be used to used to calculate an expected value of $P_R$, the received power level of the pilot signal. The expected value, $P_R$, can then be compared to, $P_M$, the received power level that is actually measured. If $P_M$ exceeds $P_R$ by at least a predetermined threshold value, K, then it may be determined that the signal was received via a repeater.

The threshold value, K, may be related to the variance, $\sigma$, of log-normal shadow fading, which is typically about 8 dB. Thus, to achieve a 95% confidence level that a signal is received via a repeater, K may be set at $2\sigma$, i.e., about 16 dB. To achieve a 99% confidence level, K may be set at $3\sigma$, i.e., about 24 dB. The calculation of the expected value, $P_R$, and the comparison of $P_R$ to the actual measured value, $P_M$, could be performed by location engine 38 or by one more other elements of wireless telecommunications network 10.

It is to be understood that equation (3) is just one example of a power-delay relationship that could be used to distinguish between wireless signals received directly and via a repeater. Other power-delay relationships, e.g., derived from other path loss models, could also be used. It is also to be understood that the criteria described above for evaluating the comparison between $P_M$ exceeds $P_R$ are exemplary only. Other criteria could also be used.

4. Exemplary Uses of Repeater-Specific Location-Determination Parameters

FIG. 3 may be used to explain an exemplary AFLT method for determining the location of mobile station 12. As shown in FIG. 3, the AFLT method relies on determining distances $d_1$, $d_2$, $d_3$, and $d_4$, which represent the distances between the mobile station and four BTSs. Because a CDMA BTS synchronizes its wireless transmissions to GPS time, a measurement of the phase of a pilot signal transmitted by the BTS, relative to GPS time, provides a measurement of the distance that the wireless signal has propagated, i.e., the distance between the mobile station and the BTS's antenna.

FIG. 3 illustrates an example of this approach. While operating in cell 50, mobile station 12 measures the phases of pilot signals from four BTSs, e.g., BTSs 18, 22, 24, and 26, to obtain transmission delay measurements $\Delta t_1$, $\Delta t_3$, $\Delta t_3$, and $\Delta t_4$. Assuming that the pilot signals are all synchronized to the same reference time, i.e., GPS time, then the distances $d_1$, $d_2$, $d_3$, and $d_4$ to BTSs 18, 22, 24, and 26, respectively, may be calculated from the transmission delays.

In practice, however, each of the pilot signals may be offset from GPS time by an amount that is characteristic for each BTS. In addition, the mobile station's clock may be offset from GPS time by a certain, unknown amount. Taking $b_0$ as the mobile station's time offset, $b_i$ as the time offset of the ith BTS, and c as the speed of light, then $d_i$ the distance between the mobile station and the ith BTS may be calculated as follows:

$$d_i = c(\Delta t_i + b_i - b_0) \quad (4)$$

Thus, the four phase measurements may be used to calculate the location of mobile station 12 by the following expressions:

$$[(x_0-x_1)^2+(y_0-y_1)^2]^{1/2}=c(\Delta t_1+b_1-b_0) \quad (5)$$

$$[(x_0-x_2)^2+(y_0-y_2)^2]^{1/2}=c(\Delta t_2+b_2-b_0) \quad (6)$$

$$[(x_0-x_3)^2+(y_0-y_3)^2]^{1/2}=c(\Delta t_3+b_3-b_0) \quad (7)$$

$$[(x_0-x_4)^2+(y_0-y_4)^2]^{1/2}=c(\Delta t_4+b_4-b_0) \quad (8)$$

In the above expressions, $x_0$ and $y_0$ are the coordinates of the mobile station, and $x_i$ and $y_i$ are the coordinates of the BTSs. The BTS coordinates may be stored in BSA database 40. The $\Delta t_i$ values are the transmission delays derived from the phases of the pilot signals measured at the mobile station. The $b_i$ values are the time offsets from GPS time of the BTSs, and may be stored in BSA database 40 as the FLC values for the BTSs. The $b_0$ variable is the time offset from GPS time for the mobile station, and c is the speed of light. Thus, given the transmission delays $\Delta t_1$, $\Delta t_3$, $\Delta t_3$, and $\Delta t_4$, derived from phase measurements of the pilot signals, and the known values for $x_i$, $y_i$, $b_i$ and c, the mobile station's coordinates ($x_0$, $y_0$) and time offset $b_0$ may be calculated using equations (5)-(8).

However, equations (5)-(8) assume that the pilot signals are received directly from the BTSs. If a pilot signal from a BTS is received via a repeater, an additional transmission delay is introduced. In that case, a repeater FLC value that corrects for the transmission delay caused by the repeater in addition to the BTSs' time offset may be used instead of the BTS FLC value that only corrects for the BTS's time offset. For example, if it is determined that the pilot signal from the first BTS is received via a repeater, then equation (5) may be replaced with the following:

$$[(x_0-x_1)^2+(y_0-y_1)^2]^{1/2}=c(\Delta t_1+r_1-b_0) \quad (9)$$

where $r_1$, the repeater's FLC value, replaces $b_1$, the first BTS's FLC value. The value of $r_1$ may correct for both the transmission delay caused by the repeater and the first BTS's time offset. The repeater FLC values may be stored in BSA database 40.

In this way, AFLT may be used to determine the location of a mobile station even when one or more of the pilot signals are received via a repeater. Repeater FLC values may similarly be used in hybrid methods.

Cell ID methods, however, do not rely on phase measurements and, thus, may not rely on repeater FLC values. In a typical cell ID approach, the cell or sector that is currently serving a mobile station is determined and the center point of the cell or sector (along with an uncertainty value) is assigned as the mobile station's location. When it is determined that the signal is received via a repeater, then the center point and uncertainty values for the repeater's coverage area may be used instead.

For example, FIG. 3 shows mobile station 12 located in cell 50. If it is determined that mobile station 12 is receiving the pilot signal of BTS 20 via a repeater, rather than directly from BTS 20, then the location of mobile station 12 may be taken as the center point of the repeater's coverage area rather than as the center point of cell 50.

It is to be understood that AFLT, hybrid, and cell ID methods are described above as only some examples of location determination methods that may use repeater-specific location-determination parameters. Other location determination methods may also make use of wireless signals that are received via a repeater. Thus, repeater FLC values and repeater coverage center points are only examples of repeater-specific location-determination parameters. Other repeater-specific parameters could be used in location determination methods.

5. Exemplary Location Determination Procedures

Figure 5:
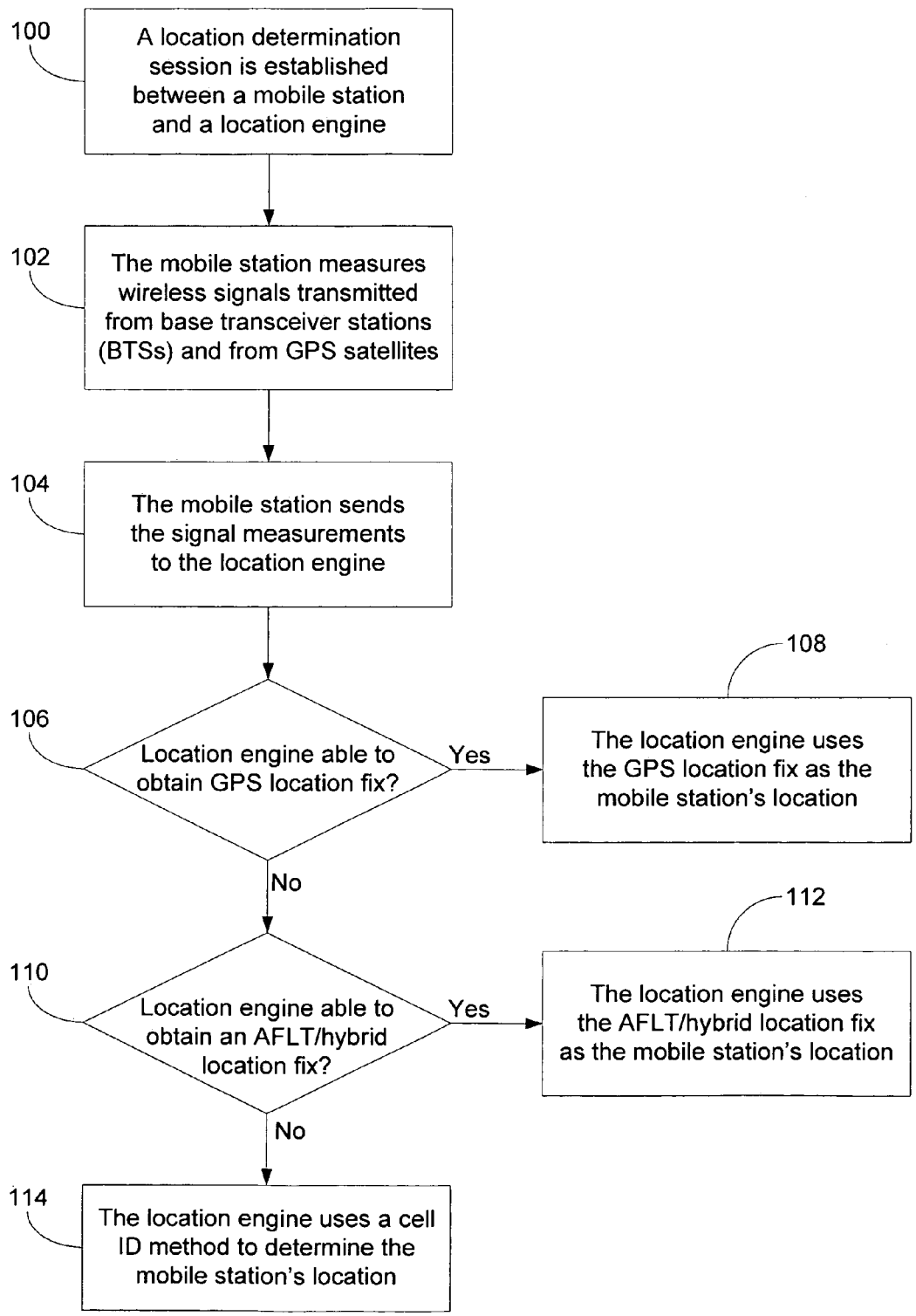
FIG. 5 is a flow chart illustrating a location determination procedure, in accordance with an exemplary embodiment.
Figure 6:
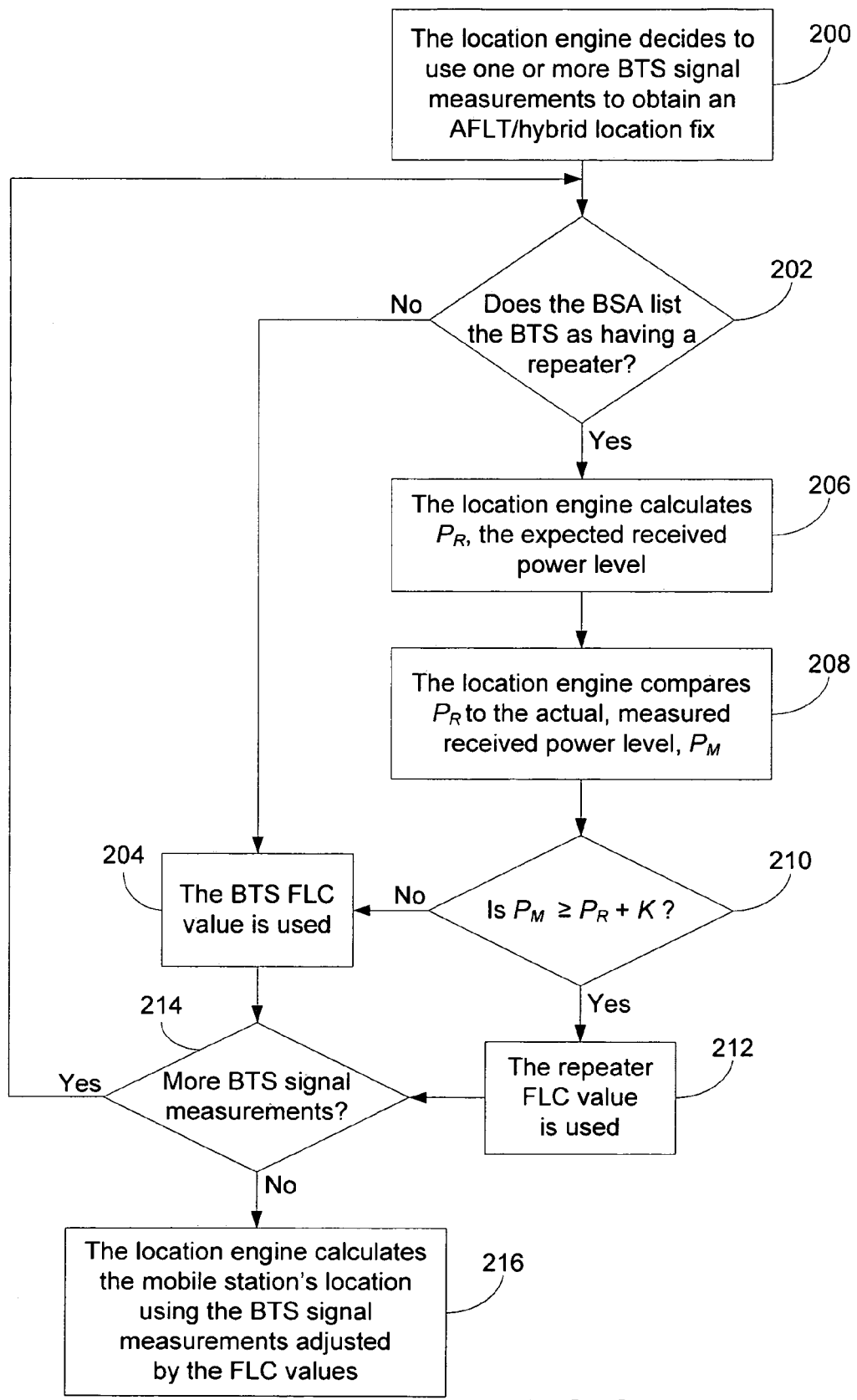
FIG. 6 is a flow chart illustrating an AFLT/hybrid location method, in accordance with an exemplary embodiment.
Figure 7:
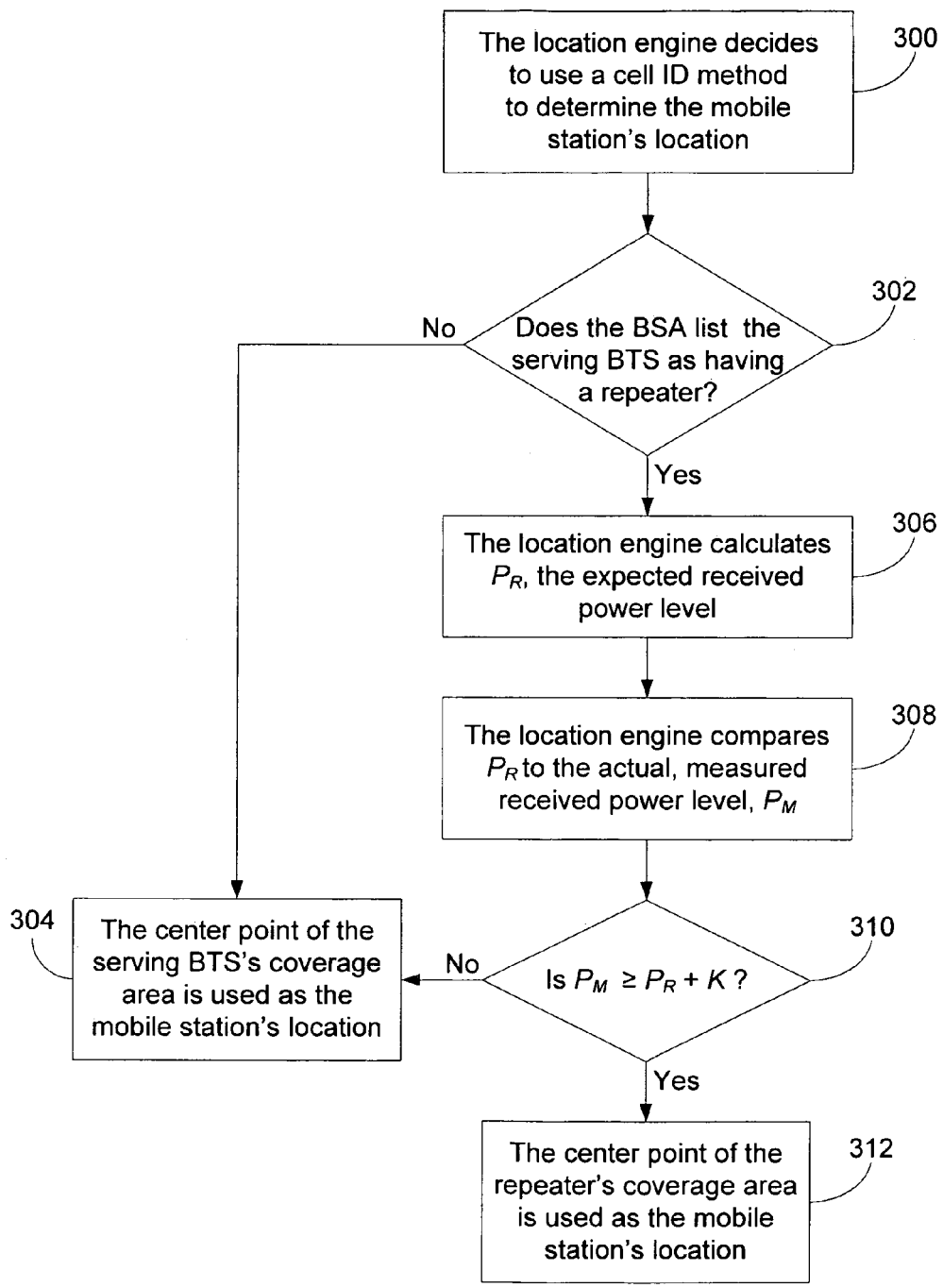
FIG. 7 is a flow chart illustrating a cell ID location method, in accordance with an exemplary embodiment.

FIG. 5 provides an overview of an exemplary location determination procedure that may be used in wireless telecommunications network 10. This procedure may make use of wireless signals from a variety of different sources (e.g., from GPS satellites and from BTSs) for location determination purposes, and various location determination methods may be applied. GPS-based methods are typically more accurate than other methods and, therefore, may be preferred. However, if a GPS location fix is not obtainable, then AFLT/hybrid methods may be used as a fall-back. If AFLT/hybrid methods are also unable to obtain a location fix, then cell ID methods may be used. FIG. 6 shows an exemplary AFLT/hybrid method that may be used, and FIG. 7 shows an exemplary cell ID method that may be used.

With reference to FIG. 5, the overall location determination process may begin when a location determination session is established between a mobile station and a location engine (e.g., between mobile station 12 and location engine 38). The location determination session could be initiated by the mobile station, by the location engine, or in some other manner. During the session, the mobile station may measure wireless signals from satellite sources and/or terrestrial sources, depending on what is available. For example, the mobile station may measure wireless signals transmitted from one or more BTSs and from one or more GPS satellites, as indicated by block 102. The mobile station may then send the signal measurements to the location engine, as indicated by block 104. For measurements of wireless signals from BTSs, the mobile station may send information that identifies the BTSs (e.g., PN offsets), as well as the signal measurements (e.g., power level and phase measurements of the BTSs pilot signals). For measurements of wireless signals from GPS satellites, the mobile station may send pseudoranges.

The location engine may then decide which location determination method to use to determine the mobile station's location. For example, the location engine may determine whether a GPS location fix can be obtained from the GPS signal measurements, as indicated by block 106. If so, the location engine may then use the GPS location fix as the mobile station's location, as indicated by block 108. The location engine might still try to obtain location fixes using other methods, e.g., to collect calibration information.

However, if the location engine is unable to obtain a GPS location fix (e.g., because of an insufficient number of GPS satellites), then the location engine may determine whether a location fix can be obtained using AFLT or hybrid methods, as indicated by block 110. If so, then the location engine uses the AFLT/hybrid location fix as the mobile station's location, as indicated by block 112. An AFLT location fix would be based on signal measurements from four BTSs. A hybrid location fix would be based on signals from one, two, or three BTSs in combination with signal measurements from one or more GPS satellites. In such AFLT or hybrid location fixes, one or more of the BTS signal measurements may be of signals that the mobile station received via a repeater.

If the location engine is unable to obtain a location fix using GPS, AFLT, or hybrid methods, then the location engine may use a cell ID method to determine the mobile station's location, as indicated by block 114. Thus, the location engine may try to obtain a location fix by first trying location determination methods that are typically more accurate. However, if the more accurate location determination methods fail, the location engine may fall back on less accurate location determination methods.

FIG. 6 illustrates an exemplary AFLT/hybrid method that enables a wireless signal received via a repeater to be used for location determination. The process may begin when the location engine decides to use one or more BTS signal measurements to obtain an AFLT or hybrid location fix, as indicated by block 200. The location engine may decide to do this after determining that a GPS location fix could not be obtained (e.g., in accordance with the overall location determination procedure of FIG. 5). The BTS signal measurements may include measured power levels and measured phases of BTS pilot signals, as measured by the mobile station.

The location engine may then determine for each BTS signal whether the mobile station received the BTS signal directly or via a repeater. To make this determination for a given BTS, the location engine may first check whether the BTS's entry in the BSA indicates that the BTS has a repeater, as indicated by block 202. If the BSA listing for the given BTS does not indicate the presence of a repeater, then the location engine may assume that the mobile station received the BTS signal directly. Thus, the location engine may use the BTS FLC value to adjust the phase measurement, as indicated by block 204. The location engine may obtain the BTS FLC value from the BSA's entry for that BTS.

On the other hand, if the BSA indicates that the BTS does have a repeater, then the location engine may analyze the power level and phase measurements that the mobile station reported for the BTS, to determine whether the mobile station received the BTS's pilot signal directly or via the repeater. To make this determination, the location engine may calculate $P_R$, the expected received power level, as indicated by block 206. For example, the location engine may use equation (3), as described above, to calculate $P_R$, based on $\Delta t$, the transmission delay indicated by the measured phase of the BTS pilot signal, and $P_T$, the known transmit power level of the BTS pilot signal. The location engine may obtain $P_T$ from the BSA's entry for the BTS.

Next, the location engine may compare $P_R$ to $P_M$, the actual received power level measured by the mobile station, as indicated by block 208. The comparison may be used to determine whether $P_M$ exceeds $P_R$ by at least a threshold value, K, as indicated by block 210. If so, then the location engine may conclude that the mobile station received the BTS pilot signal via a repeater. In that case, the location engine may use the repeater FLC value to adjust the phase measurement, as indicated by block 212. The location engine may obtain the repeater FLC value from the BSA's entry for that repeater. If, on the other hand, $P_M$ does not exceed $P_R$ (or exceeds $P_R$ by less than K), the location engine may conclude that the mobile station received the pilot signal directly. In that case, the location engine may use the BTS FLC value, as indicated by block 204.

Once the location engine has obtained the appropriate FLC value for the BTS signal measurement, the location engine may check whether there are additional BTS signal measurements that may be used for location determination, as indicated by block 214. If there are additional BTS signal measurements, then block 202 and its subsequent steps may be repeated for the next BTS signals. When the FLC values have been obtained for all of the available BTS signal measurements, the location engine may calculate the mobile station's location using the BTS signal measurements adjusted by the FLC values, as indicated by block 216.

In this way, the location engine may obtain an AFLT or hybrid location fix for the mobile station using measurements of BTS signals that are received via a repeater, as well as measurements of BTS signals that are received directly.

FIG. 7 illustrates an exemplary a cell ID location method that can be used when the mobile station is being served via a repeater. The process may begin when the location engine decides to use a cell ID method to determine the mobile station's location, as indicated by block 300. The location engine may decide to use a cell ID method as a fall-back after attempts to obtain a location fix using GPS, AFLT, and/or hybrid methods have failed (e.g., in accordance with the overall location determination procedure of FIG. 5).

The location engine may first determine whether the mobile station is being served by a BTS directly or via a repeater. To make this determination, the location engine may check whether the BSA lists the serving BTS as having a repeater, as indicated by block 302. If the BSA does not indicate that the serving BTS has a repeater, then the location engine may conclude the mobile station is being served by the BTS directly. In that case, the location engine uses the center point of the serving BTS's coverage area as the mobile station's location, as indicated by block 304. The location engine may obtain the BTS coverage area center point from the BTS's entry in the BSA. The location engine may also obtain from the BTS entry an associated uncertainty for the location fix, i.e., a value related to the size of the BTS's coverage area.

On the other hand, if the BSA indicates that the serving BTS does have a repeater, the location engine may analyze the power level and phase measurements of the serving BTS's pilot signal, as reported by the mobile station, to determine whether the mobile station is being served via the repeater. To make this determination, the location engine may calculate $P_R$, the expected received power level for the serving BTS's pilot signal, as indicated by block 306. For example, the location engine may use equation (3), as described above, to calculate $P_R$, based on $\Delta t$, the transmission delay indicated by the measured phase, and $P_T$, the known transmit power level of the serving BTS's pilot signal. The location engine may obtain $P_T$ from the BSA's entry for the serving BTS.

Next, the location engine may compare $P_R$ to $P_M$, the actual received power level measured by the mobile station, as indicated by block 308. The comparison may be used to determine whether $P_M$ exceeds $P_R$ by at least a threshold value, K, as indicated by block 310. If so, then the location engine may conclude that the mobile station is being served by the BTS via a repeater, i.e., that the mobile station is in the repeater's coverage area. In that case, the location engine uses the center point of the repeater's coverage area as the mobile station's location, as indicated by block 312. The location engine may obtain the repeater coverage area center point from a repeater entry in the BSA. The location engine may also obtain from the BSA's repeater entry an associated uncertainty for the location fix, i.e., a value related to the size of the repeater's coverage area.

In this way, the location engine can apply a cell ID location method so as to take into account the possibility that the mobile station may be served by a repeater. When a mobile station is being served via a repeater, this cell ID method beneficially returns the center point of the repeater's coverage area, which is likely to be a more accurate estimate of the mobile station's location than the center point of the BTS's coverage area.

6. Exemplary Methods for Obtaining Repeater Parameters

Figure 8:
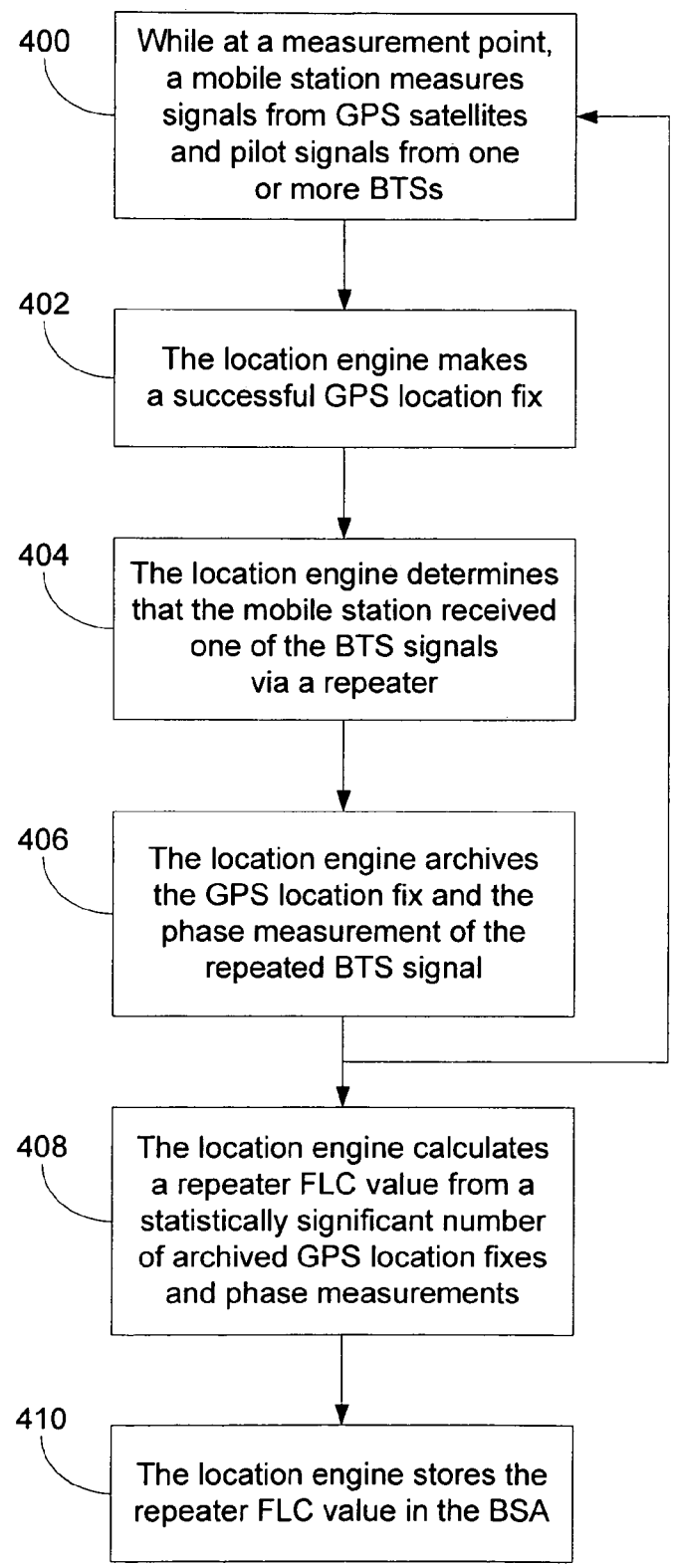
FIG. 8 is a flow chart illustrating a method for determining a repeater FLC value, in accordance with an exemplary embodiment.
Figure 9:
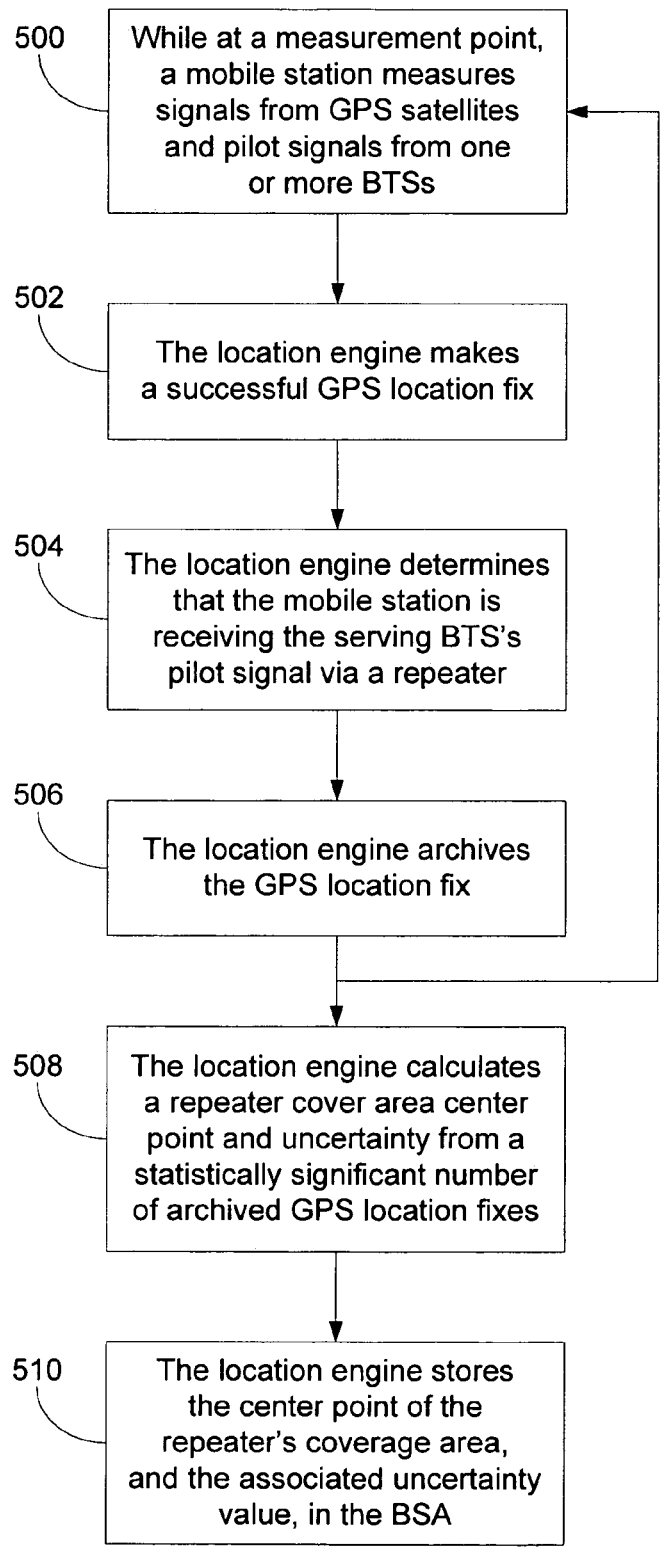
FIG. 9 is a flow chart illustrating a method for determining a center point of a repeater coverage area, in accordance with an exemplary embodiment.

The location determination procedures described above and illustrated in FIGS. 5-7 make use of repeater parameters, such as repeater FLC values and repeater coverage area center points, which may be stored in the BSA. FIGS. 8 and 9 illustrate exemplary methods for determining these repeater parameters. FIG. 8 illustrates a method for determining repeater FLC values. FIG. 9 illustrates a method of determining repeater coverage area center points and associated uncertainties.

With reference to FIG. 8, a method for determining a repeater FLC value may begin when a mobile station, while at a measurement point, measures signals from GPS satellites and pilot signals from one or more BTSs, as indicated by block 400. The measurements could be made for the specific purpose of calibrating a repeater. Alternatively, the information needed to calculate repeater FLC values could be obtained from routine location determination sessions.

The mobile station transmits the signal measurements to the location engine, and the location engine uses the signal measurements to determine the mobile station's location. In this case, the location engine is able to make a successful GPS location fix, as indicated by block 402. In addition, the location engine determines (e.g., from comparing the measured power level, $P_M$, to the expected received power level, $P_R$) that the mobile station received one of the BTS signals via a repeater, as indicated by block 404. In response, the location engine may archive the GPS location fix and the phase measurement of the repeated BTS signal, as indicated by block 406.

This archived information may then be used to calculate a repeater FLC value that corrects for the transmission delay caused by the repeater and for the time offset of the repeater's donor BTS. However, it is preferable to calculate repeater FLC values based on a statistically significant number of data points. Thus, steps 400 through 406 could be repeated to archive information from other location determination sessions, which might involve different mobile stations and/or different measurement points.

Once a statistically significant number of results (e.g., more than 30) have been archived for a given repeater, the location engine may calculate a repeater FLC value from the archived GPS location fixes and phase measurements, as indicated by block 408. The location engine may do so by calculating a calibration value from each archived phase measurement and associated GPS location fix. In an exemplary approach, the archived phase measurement is used to obtain a first estimate of the distance between the measurement point and the BTS. The first estimate is not likely to be very accurate because the transmission delay caused by the repeater is not accounted for. The GPS location fix, however, is likely to be a good estimate of the true location of the measurement point. The location of the BTS listed in the BSA may also be viewed as accurate. Thus, the GPS location fix and the location of the BTS listed in the BSA may be used to obtain a second, more accurate estimate of the distance between the measurement point and the BTS. The calibration value may then be calculated by subtracting the first and second distance estimates, so that the repeater calibration value corrects for the "error" in the phase measurement, including contributions corresponding to the transmission delay caused by the repeater and the donor BTS's time offset.

In this way, the location engine obtains a calibration value for each phase measurement and associated GPS location fix. The repeater FLC value may then be calculated as the average of these calibration values. Finally, the location engine may store the repeater FLC value in the BSA, as indicated by block 410. The location engine may repeat this process periodically as more GPS location fixes and phase measurements of repeated pilot signals become available, in order to develop more accurate repeater FLC values over time.

With reference to FIG. 9, a method for determining a center point of a repeater's coverage area may begin when a mobile station, while at a measurement point, measures signals from GPS satellites and pilot signals from one or more BTSs, as indicated by block 500. As in the method for determining repeater FLC values, the mobile station might make these measurements during a routine location determination session or for the specific purpose of collecting data that could be used to obtain location-determination parameters for a repeater.

The mobile station transmits the signal measurements to the location engine, and the location engine uses the signal measurements to determine the mobile station's location. In this case, the location engine makes a successful GPS location fix, as indicated by block 502. The location engine also determines that the mobile station is receiving the serving BTS's pilot signal via a repeater, as indicated by block 504. The location engine may conclude from these results that the mobile station is located in the repeater's coverage area. In response, the location engine may archive the GPS location fix for this repeater, as indicated by block 506. Steps 500-506 may be repeated for mobile stations at other measurement points within the repeater's coverage area.

When a statistically significant number of GPS location fixes (e.g., more than 50) have been archived for the repeater, the location engine may calculate a repeater coverage area center point of the receiver's coverage area and an associated uncertainty value, as indicated by block 508. In an exemplary embodiment, the center point of the repeater's coverage area may be expressed in terms of latitude and longitude. The location engine may calculate the center point's latitude as the average of the latitudes in the archived GPS location fixes for the repeater and may calculate the center point's longitude as the average of the longitudes in the archived GPS location fixes. To calculate an uncertainty value, the location engine may calculate the distances between the center point and each of the archived GPS location fixes. The standard deviation of these distances may be taken as the uncertainty value at the 67% confidence level.

The location engine may also store the center point of the repeater's coverage area and associated uncertainty value in the BSA (e.g., in a repeater entry), as indicated by block 510. The location engine may repeat this process periodically as more GPS location fixes for the repeater's coverage area become available, in order to develop more accurate center point and uncertainty values over time.

7. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for mobile station location determination, said method comprising:
   obtaining a measured power level and a measured phase of a wireless signal received by a mobile station;
   calculating an expected received power level for said wireless signal based on said measured phase;
   comparing said expected received power level to said measured power level to determine that said mobile station received said wireless signal via a repeater;
   obtaining at least one location-determination parameter associated with said repeater; and
   determining a location of said mobile station using said at least one location-determination parameter.

2. The method of claim 1, wherein said wireless signal is a pilot signal transmitted by a base transceiver station (BTS).

3. The method of claim 1, further comprising:
   identifying a signal source associated with said wireless signal.

4. The method of claim 3, further comprising:
   looking up said signal source in a base station almanac (BSA) to determine whether said signal source is associated with any repeater.

5. The method of claim 4, wherein calculating an expected received power level for said wireless signal based on said measured phase comprises:
   calculating a transmission delay from said measured phase;
   obtaining a transmit power level of said signal source; and
   applying a path loss model that predicts said expected received power level based on said transmit power level and said transmission delay.

6. The method of claim 5, wherein obtaining a transmit power level of said signal source comprises:
   looking up said signal source in said BSA to find said transmit power level.

7. The method of claim 1, further comprising:
   determining that said measured power level exceeds said expected received power level by at least a predetermined amount.

8. The method of claim 1, wherein said at least one location-determination parameter includes a forward link calibration (FLC) value that corrects for transmission delay associated with said repeater.

9. The method of claim 8, wherein determining a location of said mobile station using said at least one location-determination parameter comprises:
   using said FLC value to correct said measured phase in an advanced forward link trilateration (AFLT) or hybrid positioning algorithm.

10. The method of claim 1, wherein said at least one location-determination parameter includes a repeater coverage area center point.

11. The method of claim 10, wherein determining a location of said mobile station using said at least one location-determination parameter comprises:
    using said repeater coverage area center point as said location of said mobile station.

12. A system for mobile station location determination, said system comprising:
    data storage storing location-determination information, wherein said location-determination information includes location-determination parameters for a plurality of repeaters; and
    a location engine for determining locations of mobile stations using said location-determination information, said location engine being configured to (i) calculate an expected received power level of a wireless signal based on a measured phase of said wireless signal reported by a mobile station and (ii) compare said expected received power level to a measured power level reported by said mobile station to determine whether said mobile station received said wireless signal via one of said repeaters.

13. The system of claim 12, wherein said location-determination information is a base station almanac (BSA).

14. The system of claim 12, wherein said location-determination parameters include repeater forward link calibration (FLC) values.

15. The system of claim 12, wherein said location-determination parameters include repeater coverage area center points.

* * * * *